United States Patent [19]

Kitazawa

[11] Patent Number: 5,038,336
[45] Date of Patent: Aug. 6, 1991

[54] CLEANING DEVICE FOR OPTICAL PICK-UP LENS

[76] Inventor: Sadao Kitazawa, 8-5-52,Hisagi, Zushi-shi, Kanagawa, Japan

[21] Appl. No.: 398,557

[22] Filed: Aug. 25, 1989

[30] Foreign Application Priority Data

Dec. 30, 1988 [JP] Japan .................................. 63-171477

[51] Int. Cl.$^5$ .......................... G11B 7/12; G11B 23/02
[52] U.S. Cl. ........................................ 369/71; 369/72
[58] Field of Search ...................................... 369/71–74

[56] References Cited

U.S. PATENT DOCUMENTS

| | | | |
|---|---|---|---|
| 4,450,548 | 5/1984 | Hughes | 369/71 |
| 4,817,078 | 3/1989 | Iwata | 369/71 |
| 4,870,636 | 9/1989 | Yamamoto | 369/71 |

Primary Examiner—William M. Shoop, Jr.
Assistant Examiner—J. W. Cabeca
Attorney, Agent, or Firm—Sughrue, Mion, Zinn, Macpeak & Seas

[57] ABSTRACT

The cleaning device comprises a dummy disc having at least a hole covering an area in which a control signal is to be recorded, a flexible disc member coaxially arranged on the dummy disc and secured thereto at an inner periphery thereof and a cleaning member attached on one surface of the flexible disc facing to the dummy disc and protruding downwardly through the hole of the dummy disc. The cleaning device is set on a turn table integrally attached to a rotary shaft of the disc player and made in light-pressure contact with an optical pick-up raised so that a lens surface of the pick-up is wiped away thereby during its horizontal movement. In a case where the lens collides with the cleaning member, the cleaning member is pushed up by the lens through the hole of the dummy disc due to the flexibility of the flexible disc, so that a mechanical damage of the lens surface is prevented.

7 Claims, 2 Drawing Sheets

CLEANING DEVICE FOR OPTICAL PICK-UP LENS

BACKGROUND OF THE INVENTION

The present invention relates to a disc player and, particularly, to a cleaning device for cleaning a lens surface of an optical pick-up device for use in reproducing a signal recorded on a disc by irradiating it with a laser light.

It is well known that music recorded together with a control signal on a disc referred to as a compact disc is reproduced by irradiating the disc with a laser light. An outer diameter of such disc for music is around 12 cm. FIG. 2 is a plane view of a main portion of a disc player and FIG. 3 is a perspective view of a internal construction thereof which includes a base 20, a feed motor 21, a pulley 23 driven by the motor 21 through a rubber belt 22, a gear 24, a pinion and rack mechanism 25, 26 as well known. In FIG. 2, a groove 3 is formed in an upper plate 2 of a container, on which a disc 1 shown by a dotted line is disposed with a small gap therebetween.

An optical pick-up 4 is provided in the groove 3 and is movable radially outwardly as to be described later. The optical pick-up 4 includes a lens 41.

The disc 1 is mounted on a turn-table 5 fixed to a rotary shaft 6 so that it is rotated with a rotation of the shaft 6.

The optical pick-up 4 includes a laser element which emits a laser light upwardly. The laser light is collimated by the lens 41 to a thin beam with which the disc is irradiated. The laser beam reflected by a surface of the disc passes through a half mirror to a photo diode from which the signal is picked up.

When the disc 1 is mounted on the turn table 5 and the rotary shaft 6 secured thereto is rotated by such as a motor, the optical pick-up 4 approaches an initial position close to the disc 1 from its original position and emits light. For a reproduction of music, the optical pick-up 4 moves rightwardly in FIG. 2 with keeping its close positional relation to the disc 1 and, after the reproduction completes, returns to the initial position.

When the disc 1 is rotated in a horizontal plane, the optical pick-up 4 having the lens surface 41 thereon is subjected to adhesion of dust or the like which affects a laser beam irradiation adversely. Such adhesion of dust necessarily affects a reproduced sound and, so, such dust must be removed. However, since the original position of the optical pick-up 4 when the disc 1 is stationary is around a bottom of the groove 3 in FIG. 2, it is impossible to clean the lens surface 41 without removing the upper plate 2.

Japanese Utility Model Application Laid-Open No. 57931/1987 belonging to the applicant of the present application discloses a cleaning device which makes a cleaning operation of the lens surface 41 possible with the upper plate 2 being as it is and which is shown in FIG. 4 of the present application. As shown in FIG. 4 in which the optical pick-up 4 is in a position at which the disc 1 starts to rotate, the cleaning device comprises a dummy disc 1a mounting a brush 7 thereon. The dummy disc 1a may be such one having a control signal recorded as an unacceptable duplication of an original disc. The control signal includes a synchronizing signal, a transmission channel number, an address signal and a data signal in a predetermined sequence. In such case, it is possible to use the recorded control signal effectively to be described later.

The position on the dummy disc 1a in which the brush 7 is to be mounted and the size of the brush 7 are selected such that the brush 7 covers an area on which the control signal is recorded, i.e., an area from a position P1 in which the lens 41 of the optical pick-up 4 faces to the disc at a start time of disc rotation to a position P2 at which the optical pick-up 4 should complete a readout of the control signal.

In operation, when the rotary shaft 6 associated with the turn table 5 on which the dummy disc 1a is mounted is rotated, the optical pick-up 4 in the position P1 moves from its original position vertically up to the initial position along an arrow A1. Then, the pick-up 4 moves horizontally to the position P2 along an arrow A2, at which the reading of the control signal is to be completed. The brush 7 is adapted to be in contact with the lens surface 41 of the optical pick-up 4 in this area while the optical pick-up 4 moves from the position P1 to P2, so that dust thereon if any is removed thereby. In this case, due to the presence of the brush 7, the dummy disc 1a is returned to its original position for the reason that the reading of control signal fails.

Then, the dummy disc 1a is removed and the disc 1 is set on the turn table to perform an ordinary reproduction of music. In this ordinary reproduction, the optical pick-up moves along the arrows A1, A2 and then A3, as shown.

In the conventional device as mentioned, in order to shorten a time from a setting of the disc 1 on the turn table 5 to a commencement of reproduction, a moving speed of the optical pick-up 4 along the arrow A1 has been increased. In such scheme, the lens 41 of the optical pick-up 4 may collide with the brush 7 and, when the stiffness of the brush 7 is high enough to obtain a satisfactory cleaning effect, the lens surface 41 may be damaged thereby during a repeating use thereof.

SUMMARY OF THE INVENTION

An object of this invention is to provide a cleaning device for a disc player for cleaning a lens surface of an optical pick-up of a disc player without damaging the lens surface even if the lens surface collides with the cleaning device.

According to the present invention, the cleaning device comprises a dummy disc having at least a hole covering an area in which a control signal is to be recorded and a flexible disc member coaxially arranged on the dummy disc and secured thereto at an inner periphery thereof. The flexible disc member has a cleaning member attached on one surface thereof facing to the dummy disc. The cleaning member protrudes downwardly through the hole of the dummy disc.

The cleaning device constituted as mentioned above is set on a turn table integrally attached to a rotary shaft of the disc player. At a commencement of rotation of the turn table, an optical pick-up rises toward the cleaning member and a lens surface of the pick-up becomes in contact therewith, so that dust or the like on the lens surface is wiped away thereby. In a case where the lens collides with the cleaning member, the cleaning member is pushed up by the lens through the hole of the dummy disc due to the flexibility of the flexible disc, so that a mechanical damage of the lens surface is prevented. During a subsequent horizontal movement of the optical pick-up, the cleaning member is kept in soft intimate contact with the lens due to the resiliency of the flexible disc, so that the cleaning effect is improved.

DETAILED DESCRIPTION OF THE PREFERRED EMBODIMENT

Figure 1:
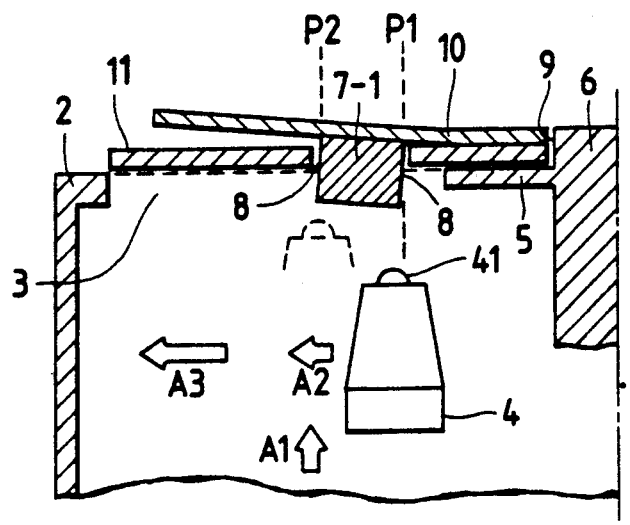
FIG. 1 is a cross section of a main portion of a disc player according to an embodiment of the present invention.
Figure 2:
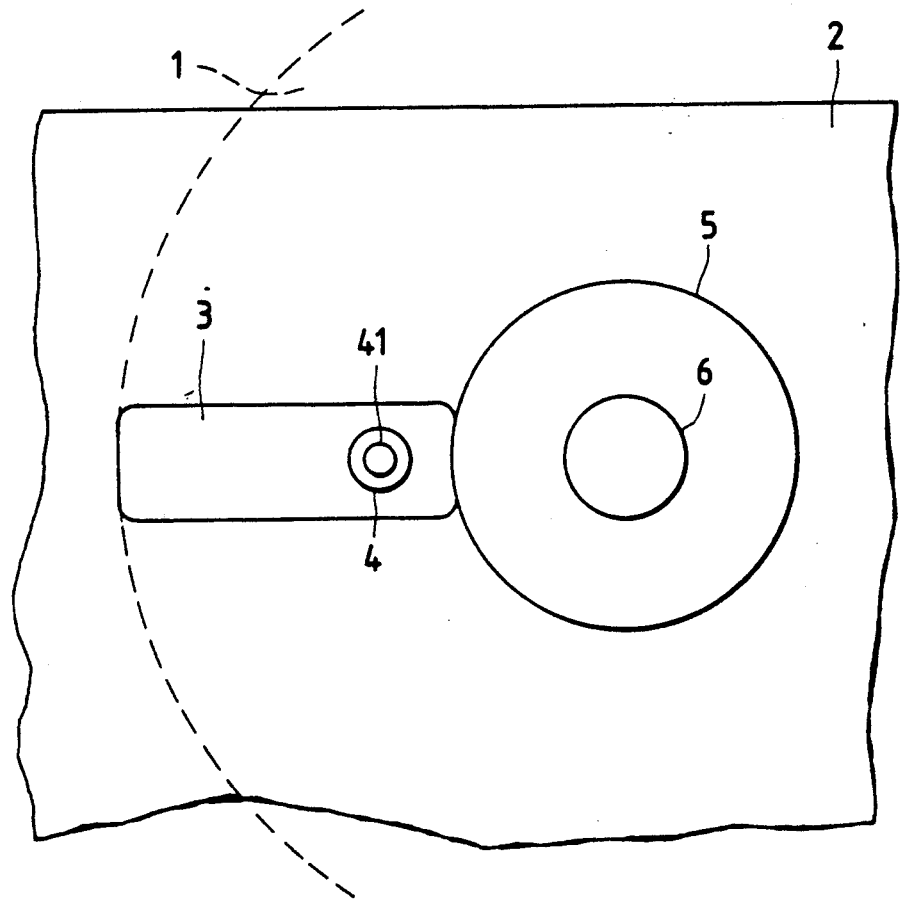
FIG. 2 is a plane view of the main portion thereof.
Figure 3:
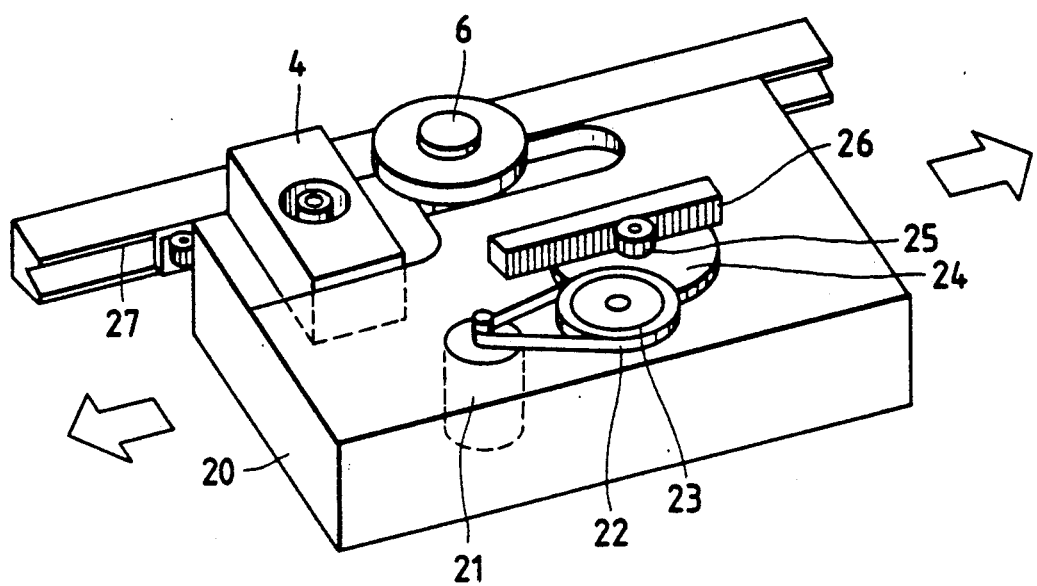
FIG. 3 is an oblique view of an internal mechanism of the disc player thereof.
Figure 4:
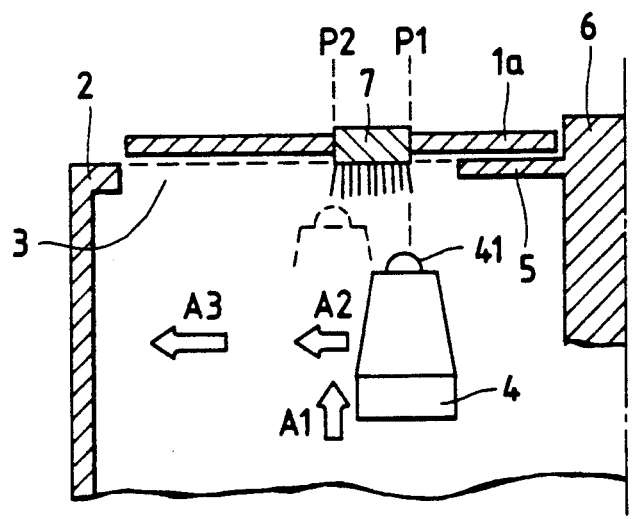
FIG. 4 is a cross section of a conventional cleaning device.

In FIG. 1 showing a cross section of an embodiment of the present invention, a cleaning device comprises a dummy disc 11 which may be a duplication of an original disc having a control signal recorded thereon and a flexible disc 10 of a resilient material and equipped with a cleaning member 7-1. The flexible disc 10 has a center hole 9 for a mounting thereof on a rotary shaft 6 and is provided on its lower surface with a cleaning member 7-1 of a material such as cloth which is preferrably impregnated easily with cleaning liquid. The flexible disc 10 is coaxially put on the dummy disc 11 having a center hole 9 identical to that of the flexible disc 10 and at least a hole 8 having radial length covering an area of the dummy disc in which a control signal is recorded, with an inner peripheral portion of the flexible disc being adhered to an inner peripheral portion of the dummy disc 11 and with the cleaning member 7-1 protruding through the hole 8 of the dummy disc 11 downwardly.

The cleaning device having such construction as mentioned above is put on the turn table 5 prior to a reproduction of the original disc 1. Since the dummy disc 11 has the area in which the control signal is recorded, a radially outward movement of an optical pick-up 4 from its original position through the position beneath the cleaning member 7-1 can be controlled thereby, during which the lens surface 41 of the optical pick-up 4 is automatically cleaned by the cleaning member 7-1. When the latter is soiled by repetitive use, it can be replaced by putting a new cleaning member on the dummy disc 11. Alternatively, the dummy disc 11 can be replaced by a new disc having new cleaning member. For protection of the lens surface, it may be advisable to apply suitable cleaning liquid to the cleaning member.

Although the cleaning member 7-1 has been described as of cloth, it may take in the form of a brush. In such case, brush hairs should be as soft as possible.

Although the present invention has been described as applied to a compact disc for musical information, it can be applied to other reproduction means such as audio-/visual laser disc so long as they use discs together with optical pick-ups.

Since the cleaning member according to the present invention does not provide any substantial mechanical shock to a lens surface of an optical pick-up, there is no problem of mechanical damage of the lens occured. Further, the cleaning operation can be easily automated by the use of a combination of inexpensive cleaning member and dummy disc and an inexpensive, high quality signal reproduction can be realized.

I claim:

1. An optical pick-up cleaning device for cleaning a lens surface of an optical pick-up of an optical information reproducing device during a time period in which the optical pick-up moves from a start position of an optical recording disc at which a reading of a control signal is to be started on an end position at which the reading is to be completed, comprising a dummy disc having a portion in which the control signal is recorded, said dummy disc having at least a hole having a radial length coextensive with said portion of said dummy disc, a flexible disc member coaxially arranged on said dummy disc and having an inner periphery adhered thereto, and a cleaning member having a radial length coextensive with said portion of said dummy disc, said cleaning member being attached on one surface of said flexible disc facing to said dummy disc and protruding downwardly through said hole of said dummy disc to an extent sufficient to be in contact with the lens surface of said optical pick-up with a light pressure during said time period.

2. The optical pick-up cleaning device as claimed in claim 1, wherein said cleaning member is formed of a porous material.

3. The optical pick-up cleaning device as claimed in claim 2, wherein said porous material is a cloth material.

4. The optical pick-up cleaning device as claimed claim 1 or 2, wherein said cleaning member is impregnated with lens cleaning liquid.

5. The optical pick-up cleaning device as claimed in claim 1, wherein said cleaning member comprises a brush.

6. The optical pick-up cleaning device as claimed in claim 1, wherein said dummy disc is a duplication of an original optical recording disc.

7. The optical pick-up cleaning device as set forth in claim 1, wherein said flexible disc member is made of resilient material.

* * * * *